UNITED STATES PATENT OFFICE.

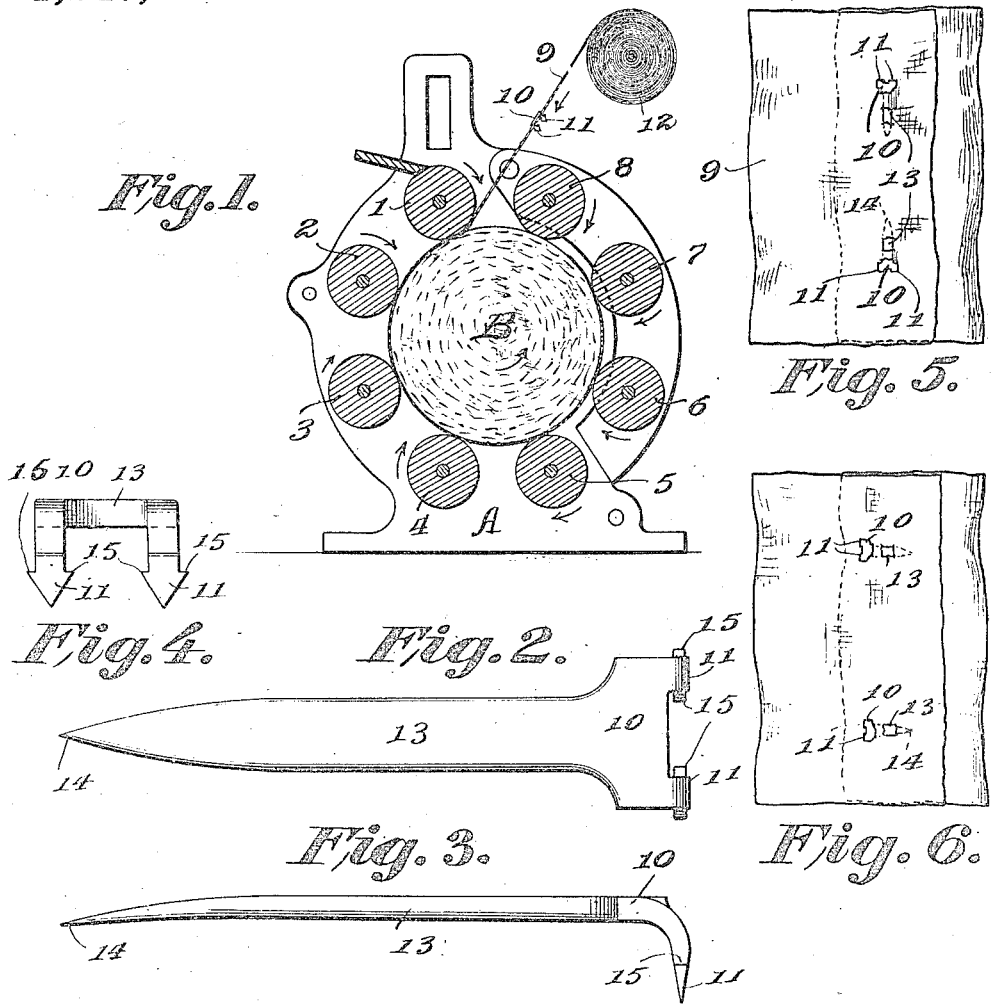

GEORGE RAYMOND BROWN, OF OKLAHOMA, OKLAHOMA, ASSIGNOR, BY MESNE ASSIGN-MENTS, TO CLAYTON GIN COMPRESS CO., OF HOUSTON, TEXAS, A CORPORATION OF TEXAS.

DEVICE FOR FASTENING COTTON-BALE COVERS.

1,247,630.   Specification of Letters Patent.   Patented Nov. 27, 1917.

Application filed June 4, 1914. Serial No. 843,007.

*To all whom it may concern:*

Be it known that I, GEORGE R. BROWN, a citizen of the United States, residing at Oklahoma City, in the county of Oklahoma and State of Oklahoma, have invented certain new and useful Improvements in Devices for Fastening Cotton-Bale Covers, of which the following is a specification, reference being had therein to the accompanying drawing.

According to the former practice of forming and wrapping round bales of cotton, a section of the burlap or other cover fabric is fed into the press after the bale has been completed; and after the cover fabric has been completely wrapped around the bale the press is stopped and preliminary fastening means such as steel pins are manually inserted through the overlapped parts of the cover to temporarily secure it in place. Then the press is opened and the bale ejected after which the cover can be permanently sewed and the temporary fastening means removed.

The ordinary method as described makes it necessary to stop the press after the completion of each bale, this resulting in considerable loss of time. The object of this invention is to provide a device whereby the cover can be put in place and temporarily fastened while the press is in motion.

Referring to the drawings,

Figure 1 represents diagrammatically a round bale press and a section of cover being wrapped around a bale in accordance with my improved method;

Figs. 2, 3 and 4 are plan side and end views respectively of the preferred form of fastening device, this being the form illustrated in Fig. 1;

Fig. 5 is a plan view of a bale showing the temporary fastening devices in place;

Fig. 6 is a view similar to Fig. 5 showing the fastening devices differently arranged.

Referring to the drawings, A represents as a whole a round bale press which, so far as my invention is concerned, can be of any one of a variety of sorts. For the purpose of illustration, however, I have shown a press in which there are a plurality of rolls, 1, 2, 3, 4, 5, 6, 7 and 8 mounted to inclose a cylindrical bale forming space. The rolls are mounted on a suitable framework, one section of which, carrying the rolls 6, 7 and 8, is movable to permit the ejection of the finished bale. The rolls can be driven by any suitable mechanism and the driving mechanism is not shown in the drawing as it constitutes no part of my present invention. The cotton bat is fed in preferably between the rolls 1 and 8 and forms the cylindrical bale which is indicated at B. After the bale has reached the required density the feeding of the bat is temporarily stopped and a strip of burlap or other suitable cover fabric is fed into the press to wrap around the bale. In Fig. 1, for the purpose of illustration, I have shown the cover 9 as being fed in between the rolls 1 and 8, but it will be understood that the exact point of feeding is immaterial. To the cover fabric at the part which will overlap another part after the bale is wrapped, I secure one or more fastening devices 10. Each device 10 has pointed projections 11, 11 which penetrate the fabric and lie in such position that they will be ready to penetrate the overlapped fabric when they reach the bale. The result is that as the fabric carrying the fastening devices 10 is completely wrapped around the bale the pressure of the rolls forces the projections 11, 11 into the inner layer of the cover fabric, thus temporarily fastening together the two fabric parts. Preferably the cover fabric is fed from a roll such as that indicated at 12. When such roll is used the operator with a knife severs the fabric along a line just back of the fastening devices 10, just before the fastening devices enter the press. If preferred, however, the fabric can be cut in advance into sections of the proper length and the sections fed singly into the press.

As soon as the section of cover fabric with its fastening devices has been fed into the press the temporary fastening takes place and the bale can be at once ejected without stopping the press. As soon as the bale is ejected the press is again closed and the formation of a new bale is started. The ejected bales with the temporary fastening devices can be then made ready for shipment by securing the covers more permanently by sewing or otherwise, the temporary fastening means being removed.

In Figs. 2, 3 and 4 I have shown in detail one form of fastening device which is found suitable. It comprises a body part 13 which is pointed at one end as indicated at 14. At the other end there are formed two pointed projections 11, 11 at substantially right angles to the body part. These are adapted to enter the cover fabric without cutting it. By preference these projections are provided with barbs 15, 15 which prevent the ready removal of the fastening device from the fabric after the projections have once pierced it.

When fastening devices of the sort shown in Figs. 2 to 4 are used they are preferably arranged in the manner indicated in Fig. 5, that is, two of them are provided, and each is pointed inward toward the center of the strip of cover material. The cover material is repeatedly pierced in order to hold the device in place and the pointed projections 11, 11 are either forced through the fabric or are in position ready to be forced through as soon as the pressure of the press is applied.

While the arrangement shown in Fig. 5 is preferable it is not the only one that can be used. In Fig. 6 I have shown the fastening devices arranged in another way, simply to show that my invention is not limited to any particular arrangement.

The several parts of the fastener remain permanently in their relative positions. After the bale has been removed from the press and the overlapping parts of the fabric cover are permanently fastened by needle and twine, the fasteners are removed. The body part 13 serves as a handle which can be readily grasped; the point part at 14, being turned at a relatively slight angle in the same direction as the barbed projections 15, serves as a stay while the fastener is in place, but can be readily released when the handle part is grasped for removal from the bale.

One of the most important advantages of my improved device is the saving of time between the completion of one bale and the starting of the next. According to the earlier practice, forty seconds and upward were required to feed in the cover fabric, to stop the press and manually insert the temporary fastening pins, to eject the bale, and to close the press to make it ready for the next bale. By using my improved device it is possible to reduce this time to about twenty seconds, that is, to about one-half of the time formerly required. This saving of time is of especial importance when but a single press is used for each bat-former and a bat accumulator provided for taking the bat while the completed bale is being wrapped and ejected. It is desirable to cut down as far as possible the time during which the acculator is used and, as above stated, by making use of my invention this time can be reduced approximately one-half.

Another important advantage incident to my invention is that the cover fabric is fed to the bale under tension and that the temporary fastening devices are forced into place while the tension in the fabric is maintained. When the temporary fastening pins were inserted manually it was customary for the operator to loosen up the fabric somewhat in order to facilitate the insertion of the pins. This loosening of the fabric obviously permitted a corresponding expansion of the bale after its removal from the press. According to my invention the fabric is kept under tension throughout and there is little or no opportunity for the bale to expand.

What I claim is:

The herein-described removable fastening device for temporarily holding together the overlapping edges of the fabric cover of a round bale of cotton under pressure, said device having an elongated body part, a series of pointed barbed projections on a line transverse to the line of the body part at one end thereof and at the other end having a point turned at a relatively slight angle to the longitudinal lines of the body part in the direction of the said barbed projections.

In testimony whereof, I affix my signature in presence of two witnesses.

GEORGE RAYMOND BROWN.

Witnesses:
 E. L. GELDER,
 W. J. HANDY.

Copies of this patent may be obtained for five cents each, by addressing the "Commissioner of Patents, Washington, D. C."